Feb. 23, 1937.  G. ROSENBERG ET AL  2,071,581
GLASS PICTURE FRAME AND DECORATIVE CORNER CONNECTER THEREFOR
Filed Aug. 27, 1936
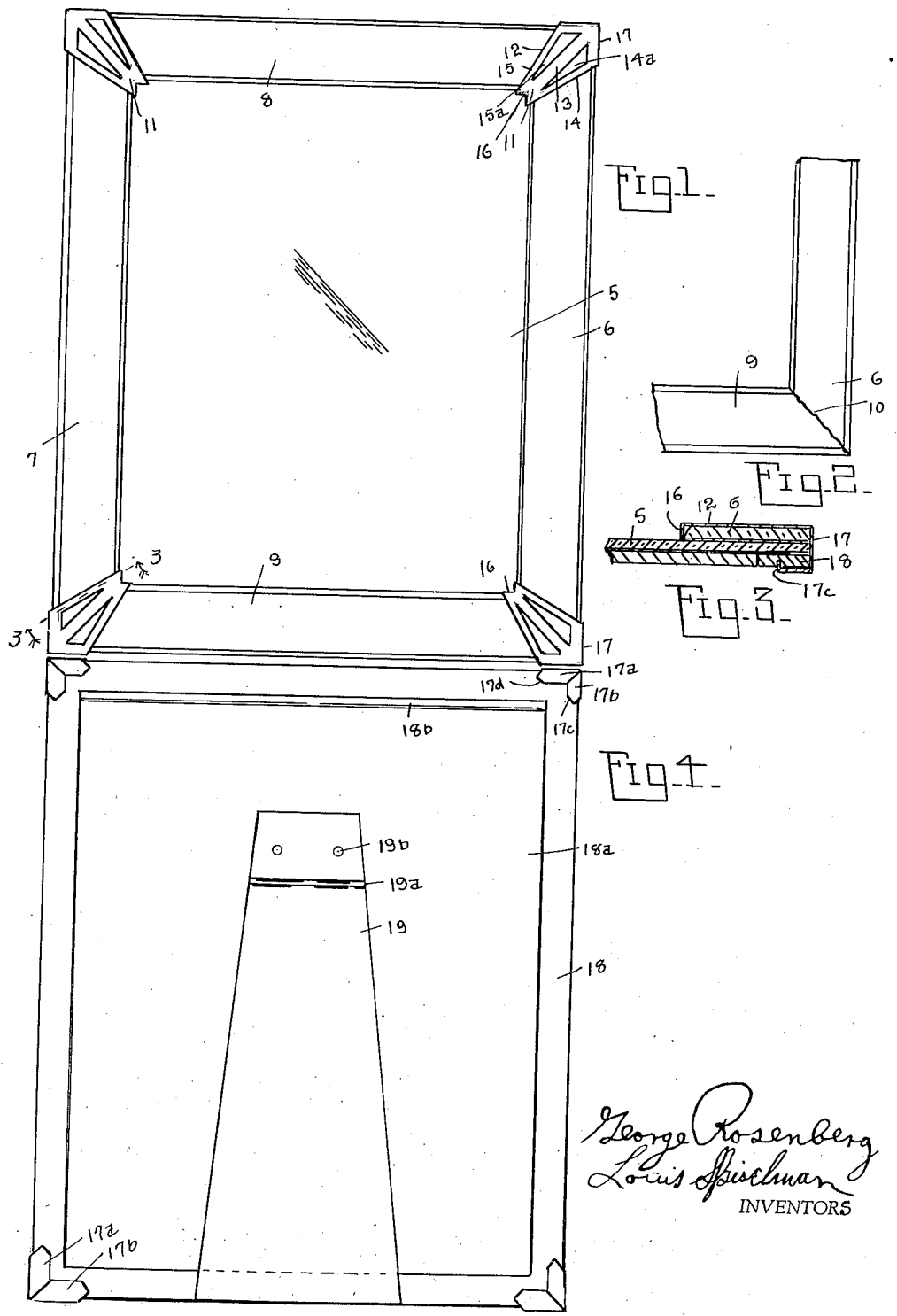
George Rosenberg
Louis Fischman
INVENTORS Patented Feb. 23, 1937

2,071,581

UNITED STATES PATENT OFFICE 2,071,581

GLASS PICTURE FRAME AND DECORATIVE CORNER CONNECTER THEREFOR

George Rosenberg and Louis Spiselman, New York, N. Y.

Application August 27, 1936, Serial No. 98,157

7 Claims. (Cl. 40—152)

This invention relates to an improved picture frame, and one of its objects is to provide a corner connecter for uniting the mitered ends of frame parts, so that the miter is concealed and the frame parts effectively locked together, and the joint made decorative.

Another object of the invention is the provision of a picture frame, wherein the main frame may be constructed of glass, mirrored or otherwise, and composed of mitered parts assembled to have angular relation to each other, with a metal corner connecter for uniting the mitered ends of the glass frame parts to each other so that a two tone effect is produced, and the rough joint formed by mitering the stock may be entirely concealed and protected, and the glass panel and backing of the completed picture frame will be effectively locked to the glass frame parts.

Another object of the invention is to provide a corner connecter for glass picture frames, wherein the connecter is provided with means for engaging the inner edges of adjacent mitered picture frame parts, and means for engaging the outer edges of the same parts, and for securing the backing and glass panel of the picture frame to the glass frame parts, so that the main strain imposed upon the picture frame is taken up by the corner connecters, and a decorative product is obtained.

With the above and other objects in view the invention consists in certain new and useful constructions, combinations and arrangements of parts, clearly described in the following drawing, and specifications, in which:—

Fig. 1 is a plan view showing the front of the improved picture frame.

Fig. 2 is a detail view, showing the mitered ends of two glass frame parts.

Fig. 3 is a detail sectional view, taken on line 3—3 of Fig. 1, looking in the direction of the arrows, on an enlarged scale.

Fig. 4 is a plan view of the rear side of the picture frame.

Referring to the drawing 5 designates the glass panel, 6 and 7 the right and left side parts of the picture frame, and 8 and 9 the top and bottom parts of the picture frame. These frame parts are preferably constructed of glass, which may be silvered on one side, or otherwise formed with a reflecting surface. Each of these parts is formed with a mitered end 10, which is formed by a suitable cutting operation, and which is usually rough and unsightly.

Picture frames constructed of glass, plain and of reflecting stock, have been used before. But it has been necessary to attach the backing needed by the use of adhesive. In time this adhesive causes a destruction of the reflective properties of the silvering, and thus renders the complete frame unsightly. The operation of applying the adhesive materially slows up the mass production of low priced picture frames, and the product offers many undesirable qualities. The adhesive when exposed to hot temperatures becomes soft and the backing separates, thus exposing the picture held in the frame to dust and dampness, and when this condition develops the picture will curl.

To render the mitered corner of glass picture frames attractive the additional expense of bevelling these corners has been resorted to, but this has the effect of thinning the stock at the meeting edges so that strength is sacrificed to good looks.

By means of our invention we eliminate the use of adhesive for attaching the backing to the glass frame parts and glass panel, and effectively lock the glass frame parts to each other, without bevelling the mitered ends, and in such manner that relative movement of the glass frame parts, and of the glass panel and cardboard backing is prevented.

The invention includes a corner connecter 11 for each corner of the assembled picture frame. Each connecter has a front triangular form or frame 12, which is formed to provide an intermediate metal bar 13, and side bars 14 and 15, which are spaced therefrom to afford openings 14a and 15a, through which the glass surface of the engaged frame parts may be observed. This metal frame is plated a suitable bright finish, or otherwise finished, so that its surface will have a tone readily distinguished over the tone of the glass frame parts, which may be colored a light blue or other suitable color. The intermediate bar 13 directly overlies the mitered meeting edges of the engaged frame parts, and thus effectively conceals these rough and unfinished edges, while the side bars 14 and 15 combine to form a decorative triangular frame, which neatly trims the corners of the picture frame.

The inner edges of the frame 12 are formed with an L-shaped flange 16, which snugly engages the inner edges of the engaged frame parts. The outer edges of the frame 12 are formed with another L-shaped flange 17, which engages the outer edges of the engaged frame parts, and these glass frame parts are thus confined between these outer and inner retaining flanges.

A backing 18, of cardboard or other material, is placed, together with the glass panel 5, against the rear sides of the picture frame parts. The outer flange 17 is malleable and consists of two lugs 17a and 17b, which are then folded under suitable pressure against the backing 18, and the terminal prongs 17c and 17d of these lugs are forced into the backing, so that the entire corner is positively locked.

It is impossible for the mitered glass frame parts to shift relative to each other, under normal handling, and the tie holds the mitered meeting faces in sufficient pressure engagement to prevent abrasion and avoid crushing.

The frame sections are constructed of glass and the backing constructed of cardboard or other material, other than glass and metal. It is not possible to unite glass to cardboard by soldering or any ordinary mechanical connecting method, which involves the use of piercing fasteners or fused connections.

Our improved corner connecter not only provides a decorative corner for the mitered glass joint, but positively couples the adjacent glass frame sections to each other, so that the mitered joint will be properly formed, but connects and locks these frame sections to the backing, so that the glass frame sections are mounted against a yielding material and are thus cushioned against fracture due to rough or careless handling.

We claim as new and patentable:—

1. The combination with a picture frame consisting of angularly related glass frame parts having mitered meeting corners, and a backing of yielding material, of a connecter for each corner of the assembled frame parts, each connecter consisting of a metal part having stops on one side to engage the inner edge portions of the engaged frame parts and means on the other side to engage and clamp the outer edge portions of the engaged frame parts and the backing against said frame parts.

2. The combination with a picture frame consisting of angularly related frame parts having mitered corners arranged in abutting relation to each other, a connecter for each corner, said connecter consisting of a metal part having an L-shaped flange on its inner edge to engage the adjacent edge portions of engaged frame parts and lugs on its outer edge to engage and straddle the outer edge portions of the engaged frame parts, and a backing for said frame retained against the frame parts by said lugs.

3. The combination with a picture frame consisting of side and end frame parts, each of said parts being constructed of glass and all of said parts being formed with mitered ends, the frame parts being assembled in angular relation to each other so that the mitered ends have abutting engagement with each other, a glass panel disposed against the frame parts, a backing for said panel disposed against the glass panel, and a connecter for each corner of the frame, each connecter having a metal frame arranged to conceal the meeting ends of the mitered corner portions and provided on its inner edge with an L-shaped flange having snug engagement with the inner edges of the engaged frame parts, and further provided on its outer end with lugs having snug engagement with the outer edges of the frame parts, said lugs being folded against the outer edges of the frame parts and against the backing to maintain clamping pressure against the backing and frame parts engaged thereby, whereby the glass frame parts are held locked to each other and to the glass panel and the backing.

4. The combination with a picture frame consisting of frame parts constructed of mirrored glass, said glass frame parts being formed with mitered ends, a glass panel disposed against one side of the frame thus composed, a backing for the glass panel, and a connecter for each corner of the frame thus composed, each connecter having an intermediate bar disposed over and concealing the gap formed by abutting mitered ends and side bars spaced therefrom to provide openings through which the mirrored glass parts may be observed to provide a plural tone decorative effect for each mitered corner portion of the complete frame, each connecter having an L-shaped flange on its inner end having abutting engagement with the inner edges of adjacent angular frame parts, and also having angular lugs on its outer end having abutting engagement with outer edge portions of the same frame parts, said lugs being folded against the backing to maintain clamping presure against said backing and said frame parts.

5. A picture frame having a plurality of frame sections formed of glass arranged in angular relation to each other, the adjacent ends of every two sections abutting against each other to provide a mitered joint, a backing for said frame sections, and a connecter for each mitered joint, each connecter consisting of a metal plate adapted to bridge the miter joint, said plate having an angular flange on its inner end adapted to abut against the inner edges of the frame sections engaged thereby and an angular flange on its outer end adapted to abut against the outer edges of the frame sections engaged thereby, and locking means carried by the outer flange adapted to be forced into the backing to lock the frame sections thereto and to each other.

6. A picture frame formed of glass sections united to each other to provide mitered meeting ends, a backing for said glass sections, and a miter concealing element mounted on each joint of the frame having means on its inner and outer ends to lock the glass sections to each other against relative outward movement and additional means to clamp each frame section to the backing.

7. A picture frame constructed of glass sections and having end portions of the sections placed in edge abutting engagement with each other, a backing for sections constructed of yielding material, and a connecter for the abutting edges of each two corner portions having flanges on the inner and outer edges thereof which correspond in angular disposition to the disposition of the glass sections to each other at such corner portions and which are adapted to lock said glass sections to each other, and malleable flanges on the outer end of the connecter which are adapted to be bent against the backing and forced into the same to positively lock the backing to the glass sections and the glass sections to each other.

GEORGE ROSENBERG.
LOUIS SPISELMAN.